(12) United States Patent
Colgrove

(10) Patent No.: US 12,511,042 B2
(45) Date of Patent: Dec. 30, 2025

(54) REPRESENTING STORAGE CAPACITY BASED ON DATA REDUCTION LEVELS

(71) Applicant: PURE STORAGE, INC., Santa Clara, CA (US)

(72) Inventor: John Colgrove, Los Altos, CA (US)

(73) Assignee: PURE STORAGE, INC., Santa Clara, CA (US)

(*) Notice: Subject to any disclaimer, the term of this patent is extended or adjusted under 35 U.S.C. 154(b) by 0 days.

(21) Appl. No.: 18/585,426

(22) Filed: Feb. 23, 2024

(65) Prior Publication Data
US 2024/0192850 A1    Jun. 13, 2024

Related U.S. Application Data

(63) Continuation of application No. 17/508,695, filed on Oct. 22, 2021, now Pat. No. 11,914,861, which is a continuation of application No. 16/555,417, filed on Aug. 29, 2019, now Pat. No. 11,163,448, which is a continuation of application No. 14/847,796, filed on Sep. 8, 2015, now Pat. No. 10,430,079.

(60) Provisional application No. 62/047,284, filed on Sep. 8, 2014.

(51) Int. Cl.
*G06F 3/06* (2006.01)

(52) U.S. Cl.
CPC .......... *G06F 3/0608* (2013.01); *G06F 3/0641* (2013.01); *G06F 3/067* (2013.01); *G06F 3/0689* (2013.01)

(58) Field of Classification Search
None
See application file for complete search history.

(56) References Cited

U.S. PATENT DOCUMENTS

| | | | |
|---|---|---|---|
| 5,706,210 A | 1/1998 | Kumano et al. |
| 5,799,200 A | 8/1998 | Brant et al. |
| 5,933,598 A | 8/1999 | Scales et al. |
| 6,012,032 A | 1/2000 | Donovan et al. |

(Continued)

FOREIGN PATENT DOCUMENTS

| | | |
|---|---|---|
| EP | 0725324 A2 | 8/1996 |
| WO | WO-2012087648 A2 | 6/2012 |

(Continued)

OTHER PUBLICATIONS

Bellamy-Mcintyre J., et al., "OpenID and the Enterprise: A Model-based Analysis of Single Sign-On Authentication," (online), 2011, 15th IEEE International Enterprise Distributed Object Computing Conference (EDOC), Dated Aug. 29, 2011, 10 pages, DOI:10.1109/EDOC.2011.26, ISBN: 978-1-4577-0362-1, Retrieved fromURL:https://www.cs.auckland.ac.nz/lutteroth/publications/McintyreLutterothWeber2011-OpenID.pdf.

(Continued)

*Primary Examiner* — Edward J Dudek, Jr.
*Assistant Examiner* — Ralph A Verderamo, III

(57) ABSTRACT

Adjusting storage capacity in a computing system that includes a computing device configured to send access requests to a storage device characterized by a first storage capacity, including: reducing data; determining, in dependence upon an amount of storage capacity saved by reducing the data, an updated storage capacity for the storage device; and exporting an updated storage capacity to the computing device.

20 Claims, 6 Drawing Sheets

(56) References Cited

U.S. PATENT DOCUMENTS

| | | | |
|---|---|---|---|
| 6,085,333 A | 7/2000 | DeKoning et al. |
| 6,643,641 B1 | 11/2003 | Snyder |
| 6,647,514 B1 | 11/2003 | Umberger et al. |
| 6,789,162 B1 | 9/2004 | Talagala et al. |
| 7,089,272 B1 | 8/2006 | Garthwaite et al. |
| 7,107,389 B2 | 9/2006 | Inagaki et al. |
| 7,146,521 B1 | 12/2006 | Nguyen |
| 7,334,124 B2 | 2/2008 | Pham et al. |
| 7,437,530 B1 | 10/2008 | Rajan |
| 7,493,424 B1 | 2/2009 | Bali et al. |
| 7,669,029 B1 | 2/2010 | Mishra et al. |
| 7,689,609 B2 | 3/2010 | Lango et al. |
| 7,743,191 B1 | 6/2010 | Liao |
| 7,899,780 B1 | 3/2011 | Shmuylovich et al. |
| 8,042,163 B1 | 10/2011 | Karr et al. |
| 8,086,585 B1 | 12/2011 | Brashers et al. |
| 8,271,700 B1 | 9/2012 | Annem et al. |
| 8,387,136 B2 | 2/2013 | Lee et al. |
| 8,437,189 B1 | 5/2013 | Montierth et al. |
| 8,465,332 B2 | 6/2013 | Hogan et al. |
| 8,566,546 B1 | 10/2013 | Marshak et al. |
| 8,578,442 B1 | 11/2013 | Banerjee |
| 8,613,066 B1 | 12/2013 | Brezinski et al. |
| 8,620,970 B2 | 12/2013 | English et al. |
| 8,762,642 B2 | 6/2014 | Bates et al. |
| 8,769,622 B2 | 7/2014 | Chang et al. |
| 8,800,009 B1 | 8/2014 | Beda, III et al. |
| 8,812,860 B1 | 8/2014 | Bray |
| 8,850,546 B1 | 9/2014 | Field et al. |
| 8,898,346 B1 | 11/2014 | Simmons |
| 8,909,854 B2 | 12/2014 | Yamagishi et al. |
| 8,931,041 B1 | 1/2015 | Banerjee |
| 8,949,863 B1 | 2/2015 | Coatney et al. |
| 8,984,602 B1 | 3/2015 | Bailey et al. |
| 8,990,905 B1 | 3/2015 | Bailey et al. |
| 9,124,569 B2 | 9/2015 | Hussain et al. |
| 9,134,922 B2 | 9/2015 | Rajagopal et al. |
| 9,209,973 B2 | 12/2015 | Aikas et al. |
| 9,250,823 B1 | 2/2016 | Kamat et al. |
| 9,300,660 B1 | 3/2016 | Borowiec et al. |
| 9,444,822 B1 | 9/2016 | Borowiec et al. |
| 9,507,532 B1 | 11/2016 | Colgrove et al. |
| 2002/0013802 A1 | 1/2002 | Mori et al. |
| 2003/0145172 A1 | 7/2003 | Galbraith et al. |
| 2003/0191783 A1 | 10/2003 | Wolczko et al. |
| 2003/0225961 A1 | 12/2003 | Chow et al. |
| 2004/0080985 A1 | 4/2004 | Chang et al. |
| 2004/0111573 A1 | 6/2004 | Garthwaite |
| 2004/0153844 A1 | 8/2004 | Ghose et al. |
| 2004/0193814 A1 | 9/2004 | Erickson et al. |
| 2004/0260967 A1 | 12/2004 | Guha et al. |
| 2005/0160416 A1 | 7/2005 | Jamison |
| 2005/0188246 A1 | 8/2005 | Emberty et al. |
| 2005/0216800 A1 | 9/2005 | Bicknell et al. |
| 2006/0015771 A1 | 1/2006 | Van Gundy et al. |
| 2006/0129817 A1 | 6/2006 | Borneman et al. |
| 2006/0161726 A1 | 7/2006 | Lasser |
| 2006/0230245 A1 | 10/2006 | Gounares et al. |
| 2006/0239075 A1 | 10/2006 | Williams et al. |
| 2007/0022227 A1 | 1/2007 | Miki |
| 2007/0028068 A1 | 2/2007 | Golding et al. |
| 2007/0055702 A1 | 3/2007 | Fridella et al. |
| 2007/0109856 A1 | 5/2007 | Pellicone et al. |
| 2007/0150689 A1 | 6/2007 | Pandit et al. |
| 2007/0168321 A1 | 7/2007 | Saito et al. |
| 2007/0220227 A1 | 9/2007 | Long |
| 2007/0294563 A1 | 12/2007 | Bose |
| 2007/0294564 A1 | 12/2007 | Reddin et al. |
| 2008/0005587 A1 | 1/2008 | Ahlquist |
| 2008/0077825 A1 | 3/2008 | Bello et al. |
| 2008/0162674 A1 | 7/2008 | Dahiya |
| 2008/0195833 A1 | 8/2008 | Park |
| 2008/0270678 A1 | 10/2008 | Cornwell et al. |
| 2008/0282045 A1 | 11/2008 | Biswas et al. |
| 2009/0077340 A1 | 3/2009 | Johnson et al. |
| 2009/0100115 A1 | 4/2009 | Park et al. |
| 2009/0198889 A1 | 8/2009 | Ito et al. |
| 2010/0052625 A1 | 3/2010 | Cagno et al. |
| 2010/0211723 A1 | 8/2010 | Mukaida |
| 2010/0246266 A1 | 9/2010 | Park et al. |
| 2010/0257142 A1 | 10/2010 | Murphy et al. |
| 2010/0262764 A1 | 10/2010 | Liu et al. |
| 2010/0325345 A1 | 12/2010 | Ohno et al. |
| 2010/0332754 A1 | 12/2010 | Lai et al. |
| 2011/0072290 A1 | 3/2011 | Davis et al. |
| 2011/0125955 A1 | 5/2011 | Chen |
| 2011/0131231 A1 | 6/2011 | Haas et al. |
| 2012/0023144 A1 | 1/2012 | Rub |
| 2012/0054264 A1 | 3/2012 | Haugh et al. |
| 2012/0079318 A1 | 3/2012 | Colgrove et al. |
| 2012/0131253 A1 | 5/2012 | McKnight et al. |
| 2012/0303919 A1 | 11/2012 | Hu et al. |
| 2012/0311000 A1 | 12/2012 | Post et al. |
| 2013/0007845 A1 | 1/2013 | Chang et al. |
| 2013/0031414 A1 | 1/2013 | Dhuse et al. |
| 2013/0036272 A1 | 2/2013 | Nelson |
| 2013/0071087 A1 | 3/2013 | Motiwala et al. |
| 2013/0145447 A1 | 6/2013 | Maron |
| 2013/0191555 A1 | 7/2013 | Liu |
| 2013/0198459 A1 | 8/2013 | Joshi et al. |
| 2013/0205173 A1 | 8/2013 | Yoneda |
| 2013/0219164 A1 | 8/2013 | Hamid |
| 2013/0227201 A1 | 8/2013 | Talagala et al. |
| 2013/0290607 A1 | 10/2013 | Chang et al. |
| 2013/0311434 A1 | 11/2013 | Jones |
| 2013/0318297 A1 | 11/2013 | Jibbe et al. |
| 2013/0332614 A1 | 12/2013 | Brunk et al. |
| 2014/0020083 A1 | 1/2014 | Fetik |
| 2014/0052946 A1* | 2/2014 | Kimmel ............... G06F 3/0631 711/159 |
| 2014/0074850 A1 | 3/2014 | Noel et al. |
| 2014/0082715 A1 | 3/2014 | Grajek et al. |
| 2014/0086146 A1 | 3/2014 | Kim et al. |
| 2014/0090009 A1 | 3/2014 | Li et al. |
| 2014/0096220 A1 | 4/2014 | Da Cruz Pinto et al. |
| 2014/0101434 A1 | 4/2014 | Senthurpandi et al. |
| 2014/0164774 A1 | 6/2014 | Nord et al. |
| 2014/0173232 A1 | 6/2014 | Reohr et al. |
| 2014/0195636 A1 | 7/2014 | Karve et al. |
| 2014/0201512 A1 | 7/2014 | Seethaler et al. |
| 2014/0201541 A1 | 7/2014 | Paul et al. |
| 2014/0208155 A1 | 7/2014 | Pan |
| 2014/0215590 A1 | 7/2014 | Brand |
| 2014/0229654 A1 | 8/2014 | Goss et al. |
| 2014/0230017 A1 | 8/2014 | Saib |
| 2014/0258526 A1 | 9/2014 | Le Sant et al. |
| 2014/0282983 A1 | 9/2014 | Ju et al. |
| 2014/0285917 A1 | 9/2014 | Cudak et al. |
| 2014/0325262 A1 | 10/2014 | Cooper et al. |
| 2014/0351627 A1 | 11/2014 | Best et al. |
| 2014/0373104 A1 | 12/2014 | Gaddam et al. |
| 2014/0373126 A1 | 12/2014 | Hussain et al. |
| 2015/0026387 A1 | 1/2015 | Sheredy et al. |
| 2015/0074463 A1 | 3/2015 | Jacoby et al. |
| 2015/0089569 A1 | 3/2015 | Sondhi et al. |
| 2015/0095515 A1 | 4/2015 | Krithivas et al. |
| 2015/0113203 A1 | 4/2015 | Dancho et al. |
| 2015/0121137 A1 | 4/2015 | McKnight et al. |
| 2015/0134920 A1 | 5/2015 | Anderson et al. |
| 2015/0149822 A1 | 5/2015 | Coronado et al. |
| 2015/0193169 A1 | 7/2015 | Sundaram et al. |
| 2015/0378613 A1* | 12/2015 | Koseki ............... G06F 3/0635 711/103 |
| 2015/0378888 A1 | 12/2015 | Zhang et al. |
| 2016/0098323 A1 | 4/2016 | Mutha et al. |
| 2016/0350009 A1 | 12/2016 | Cerreta et al. |
| 2016/0352720 A1 | 12/2016 | Hu et al. |
| 2016/0352830 A1 | 12/2016 | Borowiec et al. |
| 2016/0352834 A1 | 12/2016 | Borowiec et al. |

(56) References Cited

U.S. PATENT DOCUMENTS

| | | | |
|---|---|---|---|
| 2017/0017550 A1* | 1/2017 | Matsui | G06F 11/1076 |
| 2017/0024142 A1* | 1/2017 | Watanabe | G06F 3/0608 |

FOREIGN PATENT DOCUMENTS

| | | |
|---|---|---|
| WO | WO-2013071087 A1 | 5/2013 |
| WO | WO-2014110137 A1 | 7/2014 |
| WO | WO-2016015008 A1 | 1/2016 |
| WO | WO-2016190938 A1 | 12/2016 |
| WO | WO-2016195759 A1 | 12/2016 |
| WO | WO-2016195958 A1 | 12/2016 |
| WO | WO-2016195961 A1 | 12/2016 |

OTHER PUBLICATIONS

ETSI: "Network Function Virtualisation (NFV); Resiliency Requirements," ETSI GS NFV-REL 001, V1.1.1, etsi.org (Online), Jan. 2015, 82 Pages, Retrieved from URL:www.etsi.org/deliver/etsi_gs/NFV-RELJ001_099/001/01.01.01_60/gs_NFV-REL001v010101p.pdf.

Faith R., "Dictzip File Format," GitHub.com (Online), 01 Page, [Accessed on Jul. 28, 2015] Retrieved from URL: github.com/fidlej/idzip.

Google Search of: "Storage Array Define," for U.S. Appl. No. 14/725,278 on Nov. 4, 2015 , Results Limited to Entries Dated before 2012, 01 Page.

Hota C., et al., "Capability-Based Cryptographic Data Access Control in Cloud Computing," International Journal of Advanced Networking and Applications, Eswar Publications, India, Aug. 13, 2011, vol. 1, No. 1, 10 Pages.

Hu X-Y., et al., "Container Marking: Combining Data Placement, Garbage Collection and Wear Levelling for Flash," 19th Annual IEEE International Symposium on Modeling, Analysis, and Simulation of Computer and Telecommunications Systems, Jul. 25-27, 2011, 11 Pages, DOI: 10.1109/MASCOTS.2011.50, ISBN: 978-0-7695-4430-4.

International Search Report and Written Opinion for International Application No. PCT/US2016/015006, Apr. 29, 2016, 12 pages.

International Search Report and Written Opinion for International Application No. PCT/US2016/016333, Jun. 8, 2016, 12 pages.

International Search Report and Written Opinion for International Application No. PCT/US2016/020410, mailed Jul. 8, 2016, 17 pages.

International Search Report and Written Opinion for International Application No. PCT/US2016/032052, mailed Aug. 30, 2016, 17 Pages.

International Search Report and Written Opinion for International Application No. PCT/US2016/032084, mailed Jul. 18, 2016, 12 Pages.

International Search Report and Written Opinion for International Application No. PCT/US2016/035492, mailed Aug. 17, 2016, 10 pages.

International Search Report and Written Opinion for International Application No. PCT/US2016/036693, mailed Aug. 29, 2016, 10 Pages.

International Search Report and Written Opinion for International Application No. PCT/US2016/038758, mailed Oct. 7, 2016, 10 Pages.

International Search Report and Written Opinion for International Application No. PCT/US2016/040393, mailed Sep. 22, 2016, 10 Pages.

International Search Report and Written Opinion for International Application No. PCT/US2016/044020, mailed Sep. 30, 2016, 11 Pages.

International Search Report and Written Opinion for International Application No. PCT/US2016/044874, mailed Oct. 7, 2016, 11 Pages.

International Search Report and Written Opinion for International Application No. PCT/US2016/044875, mailed Oct. 5, 2016, 13 pages.

International Search Report and Written Opinion for International Application No. PCT/US2016/044876, mailed Oct. 21, 2016, 12 Pages.

International Search Report and Written Opinion for International Application No. PCT/US2016/044877, mailed Sep. 29, 2016, 13 pages.

International Search Report and Written Opinion of the International Application No. PCT/US2016/015008, mailed May 4, 2016, 12 pages.

Kong K., "Using PCI Express as the Primary System Interconnect in Multiroot Compute, Storage, Communications and Embedded Systems," IDT, White Paper, Aug. 28, 2008, 12 Pages, [Retrieved by WIPO on Dec. 1, 2014] Retrieved from URL: http://www.idt.com/document/whp/idt-pcie-multi-root-white-paper.

Li J., et al., "Access Control for the Services Oriented Architecture," Proceedings of the ACM Workshop on Secure Web Services (SWS), ACM, New York, Nov. 2, 2007, pp. 9-17.

Microsoft: "Hybrid for SharePoint Server 2013—Security Reference Architecture," Oct. 1, 2014, pp. 1-53, XP055296534, [Retrieved On Aug. 19, 2016] Retrieved from URL: http://hybrid.office.com/img/Security_Reference_Architecture.pdf.

Microsoft, "Hybrid Identity Management", Microsoft (online), Apr. 2014, 2 pages, URL: download.microsoft.com/ download/E/A/E/EAE57CD1-A80B-423C-96BB-142FAAC630B9/Hybrid_Identity_Datasheet.pdf.

Microsoft, "Hybrid Identity," (online), Dated Apr. 2014, 36 pages, Retrieved from URL: http://aka.ms/HybridIdentityWp.

Storer M.W., et al., "Secure Data Deduplication," Proceedings of the 4th ACM International Workshop on Storage Security And Survivability (StorageSS'08), ACM New York, NY, USA, Oct. 31, 2008, 10 Pages, DOI: 10.1145/1456471.

Sweere P., "Creating Storage Class Persistent Memory with NVDIMM," Flash Memory Summit, Aug. 2013, 22 Pages, Retrieved from URL: http://www.flashmemorysummit.com/English/Collaterals/Proceedings/2013/20130814_T2_Sweere. pdf.

Techopedia, "What is a Disk Array," techopedia.com (online), Jan. 13, 2012, 1 Page, Retrieved from URL: https://web.archive.org/web/20120113053358/http://www.techopedia.com/definition/1009/disk-array.

Webopedia, "What is a disk array," webopedia.com (online), May 26, 2011, 2 Pages, Retrieved from URL: https://web/archive.org/web/20110526081214/http://www.webopedia.com/TERM/D/disk_array.html.

Wikipedia, "Convergent Encryption," Wikipedia.org (online), Accessed on Sep. 8, 2015, 2 pages, Retrieved from URL: en.wikipedia.org/wiki/Convergent_encryption.

Pcmag, "Storage Array Definition", Published May 10, 2013, URL: http://web.archive.org/web/20130510121646/http://www.pcmag.com/encyclopedia/term/52091/storage-array, 1 page.

* cited by examiner

REPRESENTING STORAGE CAPACITY BASED ON DATA REDUCTION LEVELS

CROSS-REFERENCE TO RELATED APPLICATIONS

This is a continuation application for patent entitled to a filing date and claiming the benefit of earlier-filed U.S. Pat. No. 11,914,861, issued Feb. 27, 2024, herein incorporated by reference in its entirety, which is a continuation of U.S. Pat. No. 11,163,448, issued Nov. 2, 2021, which is a continuation of U.S. Pat. No. 10,430,079, issued Oct. 1, 2019, which claims priority from U.S. Provisional Application No. 62/047,284, filed Sep. 8, 2014.

BACKGROUND

Technical Field

The field of technology is data processing, or, more specifically, methods, apparatuses, and products for adjusting storage capacity in a computing system.

Background Art

The use of solid-state storage devices (e.g., flash memory) in computer systems and storage systems is increasing due to the performance of flash memory as compared to traditional disk storage devices (e.g., hard disk drives (HDDs)). Flash memory offers low-power consumption combined with fast, random (input/output) I/O accesses as compared to traditional disk storage technology. Until recently, flash memory was used primarily in embedded applications, but the use of flash memory has expanded to other applications including desktop and enterprise storage.

Embedded applications which use flash memory typically include custom operating systems and custom file systems which are designed around the advantages and limitations of flash memory. However, when using flash memory in different applications, such as in desktop and enterprise storage, these systems often have legacy operating systems and file systems which are designed and optimized for use with HDD storage technology. These legacy operating systems and file systems are not able to take full advantage of all of the characteristics of flash memory. Also, these legacy systems may reduce the effective life of flash memory if wear leveling and other techniques are not utilized to prevent frequent writes to the same flash memory locations.

Additionally, inefficiencies are often introduced when integrating host storage systems with storage devices such as flash memory. For example, host file systems typically need to maintain a mapping between a logical location of a data block, as within a file, and the physical address of that block on the storage device. However, since the physical location of a block may change due to garbage collection and other device-internal processes, flash memory storage devices also maintain a mapping between the block address as provided by the host and the actual physical address of the block.

Many storage systems utilize data deduplication to reduce the total amount of data stored. One of the simplest and fastest techniques is to deduplicate using a fixed block size. When all blocks are the same size, garbage collection, allocation, overwriting, and data integrity are all simplified. However, supporting compression in addition to deduplication increases the complexity of these tasks. For example, compressed blocks will typically have different sizes, making it more challenging to track the amount of used and free storage space.

SUMMARY OF INVENTION

Methods, apparatus, and products for adjusting storage capacity in a computing system that includes a computing device configured to send access requests to a storage device characterized by a first storage capacity, including: reducing data; determining, in dependence upon an amount of storage capacity saved by reducing the data, an updated storage capacity for the storage device; and exporting an updated storage capacity to the computing device.

The foregoing and other objects, features and advantages of the invention will be apparent from the following more particular descriptions of example embodiments of the invention as illustrated in the accompanying drawings wherein like reference numbers generally represent like parts of example embodiments of the invention.

DETAILED DESCRIPTION OF EXAMPLE EMBODIMENTS

Figure 1:
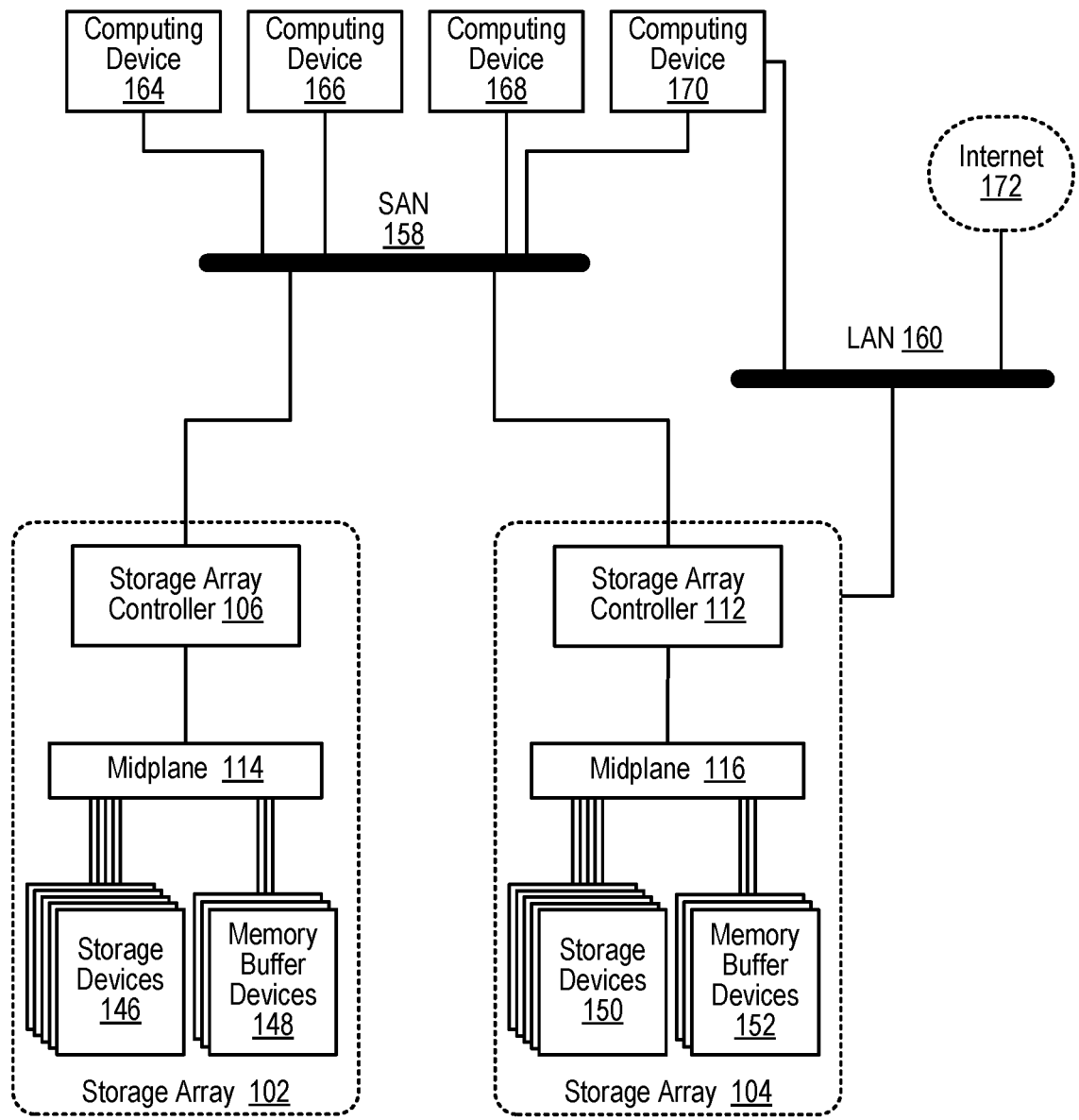
FIG. 1 sets forth a block diagram of an example system in which storage capacity may be adjusted according to embodiments of the present disclosure.

Example methods, apparatuses, and products for adjusting storage capacity in a computing system in accordance with the present disclosure are described with reference to the accompanying drawings, beginning with FIG. 1. FIG. 1 sets forth a block diagram of a system in which storage capacity may be adjusted according to embodiments of the present disclosure. The system of FIG. 1 includes a number of computing devices (164, 166, 168, 170). The computing devices (164, 166, 168, 170) depicted in FIG. 1 may be implemented in a number of different ways. For example, the computing devices (164, 166, 168, 170) depicted in FIG. 1 may be embodied as a server in a data center, a workstation, a personal computer, a notebook, or the like.

The computing devices (164, 166, 168, 170) in the example of FIG. 1 are coupled for data communications to a number of storage arrays (102, 104) through a storage area network ('SAN') (158) as well as a local area network (160) ('LAN'). The SAN (158) may be implemented with a variety of data communications fabrics, devices, and protocols. Example fabrics for such a SAN (158) may include Fibre Channel, Ethernet, Infiniband, Serial Attached Small Computer System Interface ('SAS'), and the like. Example data communications protocols for use in such a SAN (158) may include Advanced Technology Attachment ('ATA'), Fibre Channel Protocol, SCSI, iSCSI, HyperSCSI, and others. Readers of skill in the art will recognize that a SAN is just one among many possible data communications couplings which may be implemented between a computing device (164, 166, 168, 170) and a storage array (102, 104). For example, the storage devices (146, 150) within the storage arrays (102, 104) may also be coupled to the computing devices (164, 166, 168, 170) as network attached storage ('NAS') capable of facilitating file-level access, or even using a SAN-NAS hybrid that offers both file-level protocols and block-level protocols from the same system. Any other such data communications coupling is well within the scope of embodiments of the present disclosure.

The local area network (160) of FIG. 1 may also be implemented with a variety of fabrics and protocols. Examples of such fabrics include Ethernet (802.3), wireless (802.11), and the like. Examples of such data communications protocols include Transmission Control Protocol ('TCP'), User Datagram Protocol ('UDP'), Internet Protocol ('IP'), HyperText Transfer Protocol ('HTTP'), Wireless Access Protocol ('WAP'), Handheld Device Transport Protocol ('HDTP'), Session Initiation Protocol ('SIP'), Real Time Protocol ('RTP') and others as will occur to those of skill in the art.

The example storage arrays (102, 104) of FIG. 1 provide persistent data storage for the computing devices (164, 166, 168, 170). Each storage array (102, 104) depicted in FIG. 1 includes a storage array controller (106, 112). Each storage array controller (106, 112) may be embodied as a module of automated computing machinery comprising computer hardware, computer software, or a combination of computer hardware and software. The storage array controllers (106, 112) may be configured to carry out various storage-related tasks. Such tasks may include writing data received from the one or more of the computing devices (164, 166, 168, 170) to storage, erasing data from storage, retrieving data from storage to provide the data to one or more of the computing devices (164, 166, 168, 170), monitoring and reporting of disk utilization and performance, performing RAID (Redundant Array of Independent Drives) or RAID-like data redundancy operations, compressing data, encrypting data, and so on.

Each storage array controller (106, 112) may be implemented in a variety of ways, including as a Field Programmable Gate Array ('FPGA'), a Programmable Logic Chip ('PLC'), an Application Specific Integrated Circuit ('ASIC'), or computing device that includes discrete components such as a central processing unit, computer memory, and various adapters. Each storage array controller (106, 112) may include, for example, a data communications adapter configured to support communications via the SAN (158) and the LAN (160). Although only one of the storage array controllers (112) in the example of FIG. 1 is depicted as being coupled to the LAN (160) for data communications, readers will appreciate that both storage array controllers (106, 112) may be independently coupled to the LAN (160). Each storage array controller (106, 112) may also include, for example, an I/O controller or the like that couples the storage array controller (106, 112) for data communications, through a midplane (114), to a number of storage devices (146, 150), and a number of write buffer devices (148, 152).

Each write buffer device (148, 152) may be configured to receive, from the storage array controller (106, 112), data to be stored in the storage devices (146). Such data may originate from any one of the computing devices (164, 166, 168, 170). In the example of FIG. 1, writing data to the write buffer device (148, 152) may be carried out more quickly than writing data to the storage device (146, 150). The storage array controller (106, 112) may be configured to effectively utilize the write buffer devices (148, 152) as a quickly accessible buffer for data destined to be written to storage. In this way, the latency of write requests may be significantly improved relative to a system in which the storage array controller writes data directly to the storage devices (146, 150).

A 'storage device' as the term is used in this specification refers to any device configured to record data persistently. The term 'persistently' as used here refers to a device's ability to maintain recorded data after loss of a power source. Examples of storage devices may include mechanical, spinning hard disk drives, Solid-state drives (e.g., "Flash drives"), and the like.

The example storage devices (146, 150) depicted in FIG. 1 may be configured for adjusting storage capacity in a computing system by reducing data, determining an updated storage capacity for the storage device (146, 150) in dependence upon an amount of storage capacity saved by reducing the data, and exporting an updated storage capacity to the computing device, as will be described in greater detail below. The storage devices (146, 150) depicted in FIG. 1 may be further configured for adjusting storage capacity in a computing system by performing other steps such as, for example, compressing the data, deduplicating the data, determining the updated storage capacity for the storage device in dependence upon a predetermined amount of storage capacity held in reserve, determining the updated storage capacity for the storage device in dependence upon an anticipated reduction level, exporting the updated storage capacity to the computing device periodically, and exporting the updated storage capacity upon storing the data, as will also be described in greater detail below.

The storage array controllers (106, 112) of FIG. 1 may be useful in adjusting storage capacity in a computing system according to embodiments of the present disclosure. The storage array controllers (106, 112) may assist in adjusting storage capacity in a computing system by tracking the storage capacity of each storage device (146, 150), even as the capacity of each storage device (146, 150) changes, and performing other functions as will be described in greater detail below.

The arrangement of computing devices, storage arrays, networks, and other devices making up the example system illustrated in FIG. 1 are for explanation, not for limitation. Systems useful according to various embodiments of the present disclosure may include different configurations of servers, routers, switches, computing devices, and network architectures, not shown in FIG. 1, as will occur to those of skill in the art.

Adjusting storage capacity in a computing system in accordance with embodiments of the present disclosure is generally implemented with computers. In the system of FIG. 1, for example, all the computing devices (164, 166, 168, 170) and storage controllers (106, 112) may be implemented to some extent at least as computers. For further explanation, therefore, FIG. 2 sets forth a block diagram of a storage array controller (202) useful in adjusting storage capacity in a computing system according to embodiments of the present disclosure.

Figure 2:
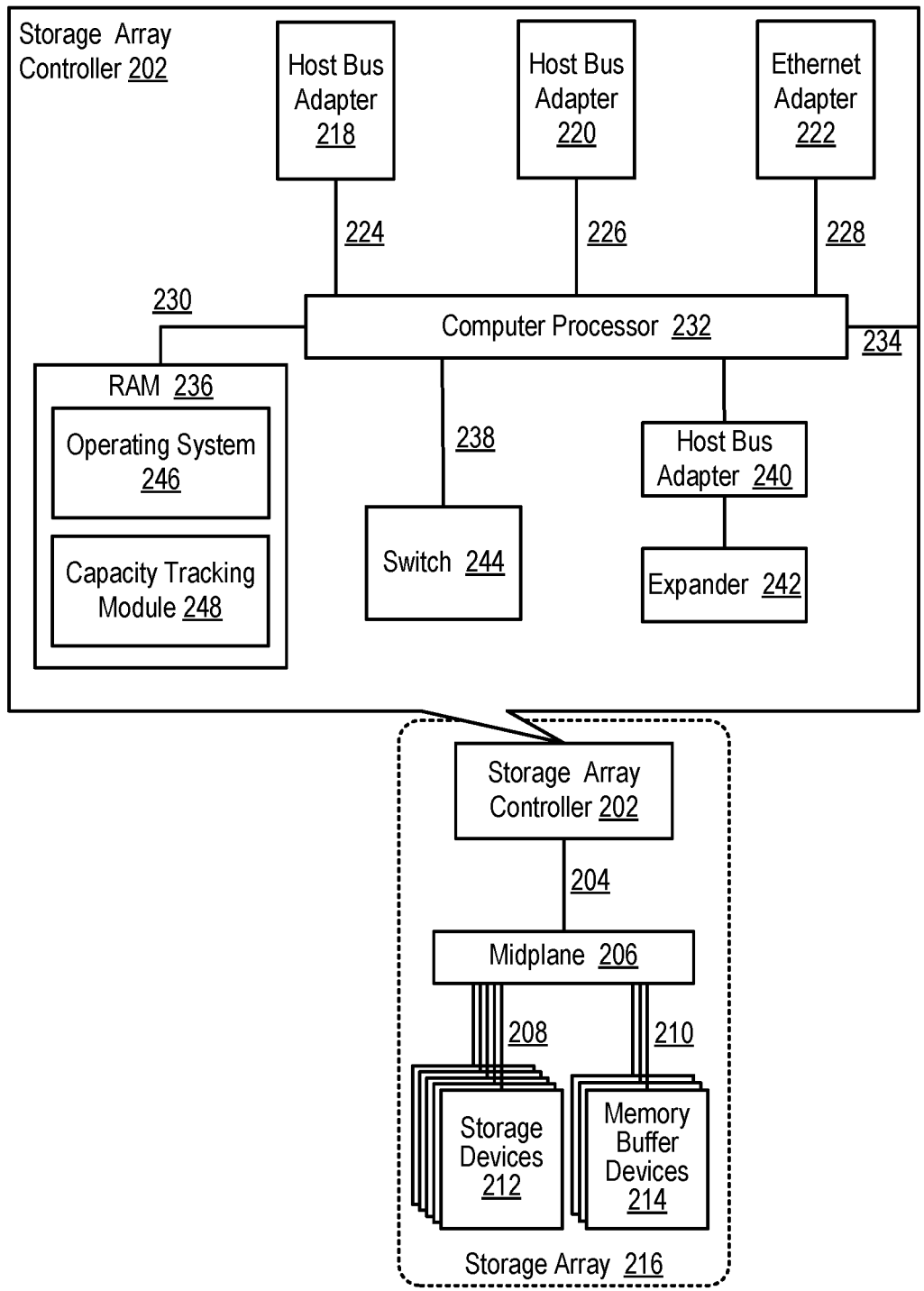
FIG. 2 sets forth a block diagram of an example storage array controller useful in adjusting storage capacity in a computing system according to embodiments of the present disclosure.

The storage array controller (202) of FIG. 2 is similar to the storage array controllers depicted in FIG. 1, as the storage array controller (202) of FIG. 2 is communicatively coupled, via a midplane (206), to one or more storage devices (212) and to one or more memory buffer devices (214) that are included as part of a storage array (216). The storage array controller (202) may be coupled to the midplane (206) via one or more data communications links (204) and the midplane (206) may be coupled to the storage devices (212) and the memory buffer devices (214) via one or more data communications links (208, 210). The data communications links (204, 208, 210) of FIG. 2 may be embodied, for example, as Peripheral Component Interconnect Express ('PCIe') bus.

The storage array controller (202) of FIG. 2 includes at least one computer processor (232) or 'CPU' as well as random access memory ('RAM') (236). The computer processor (232) may be connected to the RAM (236) via a data communications link (230), which may be embodied as a high speed memory bus such as a Double-Data Rate 4 ('DDR4') bus.

Stored in RAM (214) is an operating system (246). Examples of operating systems useful in storage array controllers (202) configured for adjusting storage capacity in a computing system according to embodiments of the present disclosure include UNIX™, Linux™, Microsoft Windows™, and others as will occur to those of skill in the art. Also stored in RAM (236) is a capacity planning module (248), a module that includes computer program instructions useful in adjusting storage capacity in a computing system according to embodiments of the present disclosure. The capacity tracking module (248) may be configured to monitor the capacity of one or more storage devices (212), including receiving updated storage capacities for one or more of the storage devices (212), and further configured to perform other functions as will be described in greater detail below. Readers will appreciate that while the capacity tracking module (248) and the operating system (246) in the example of FIG. 2 are shown in RAM (168), many components of such software may also be stored in non-volatile memory such as, for example, on a disk drive, on a solid-state drive, and so on.

The storage array controller (202) of FIG. 2 also includes a plurality of host bus adapters (218, 220, 222) that are coupled to the processor (232) via a data communications link (224, 226, 228). Each host bus adapter (218, 220, 222) may be embodied as a module of computer hardware that connects the host system (i.e., the storage array controller) to other network and storage devices. Each of the host bus adapters (218, 220, 222) of FIG. 2 may be embodied, for example, as a Fibre Channel adapter that enables the storage array controller (202) to connect to a SAN, as an Ethernet adapter that enables the storage array controller (202) to connect to a LAN, and so on. Each of the host bus adapters (218, 220, 222) may be coupled to the computer processor (232) via a data communications link (224, 226, 228) such as, for example, a PCIe bus.

The storage array controller (202) of FIG. 2 also includes a host bus adapter (240) that is coupled to an expander (242). The expander (242) depicted in FIG. 2 may be embodied as a module of computer hardware utilized to attach a host system to a larger number of storage devices than would be possible without the expander (242). The expander (242) depicted in FIG. 2 may be embodied, for example, as a SAS expander utilized to enable the host bus adapter (240) to attach to storage devices in an embodiment where the host bus adapter (240) is embodied as a SAS controller.

The storage array controller (202) of FIG. 2 also includes a switch (244) that is coupled to the computer processor (232) via a data communications link (238). The switch (244) of FIG. 2 may be embodied as a computer hardware device that can create multiple endpoints out of a single endpoint, thereby enabling multiple devices to share what was initially a single endpoint. The switch (244) of FIG. 2 may be embodied, for example, as a PCIe switch that is coupled to a PCIe bus (238) and presents multiple PCIe connection points to the midplane (206).

The storage array controller (202) of FIG. 2 also includes a data communications link (234) for coupling the storage array controller (202) to other storage array controllers. Such a data communications link (234) may be embodied, for example, as a QuickPath Interconnect ('QPI') interconnect, as PCIe non-transparent bridge ('NTB') interconnect, and so on.

Readers will recognize that these components, protocols, adapters, and architectures are for illustration only, not limitation. Such a storage array controller may be implemented in a variety of different ways, each of which is well within the scope of the present disclosure.

Figure 3:
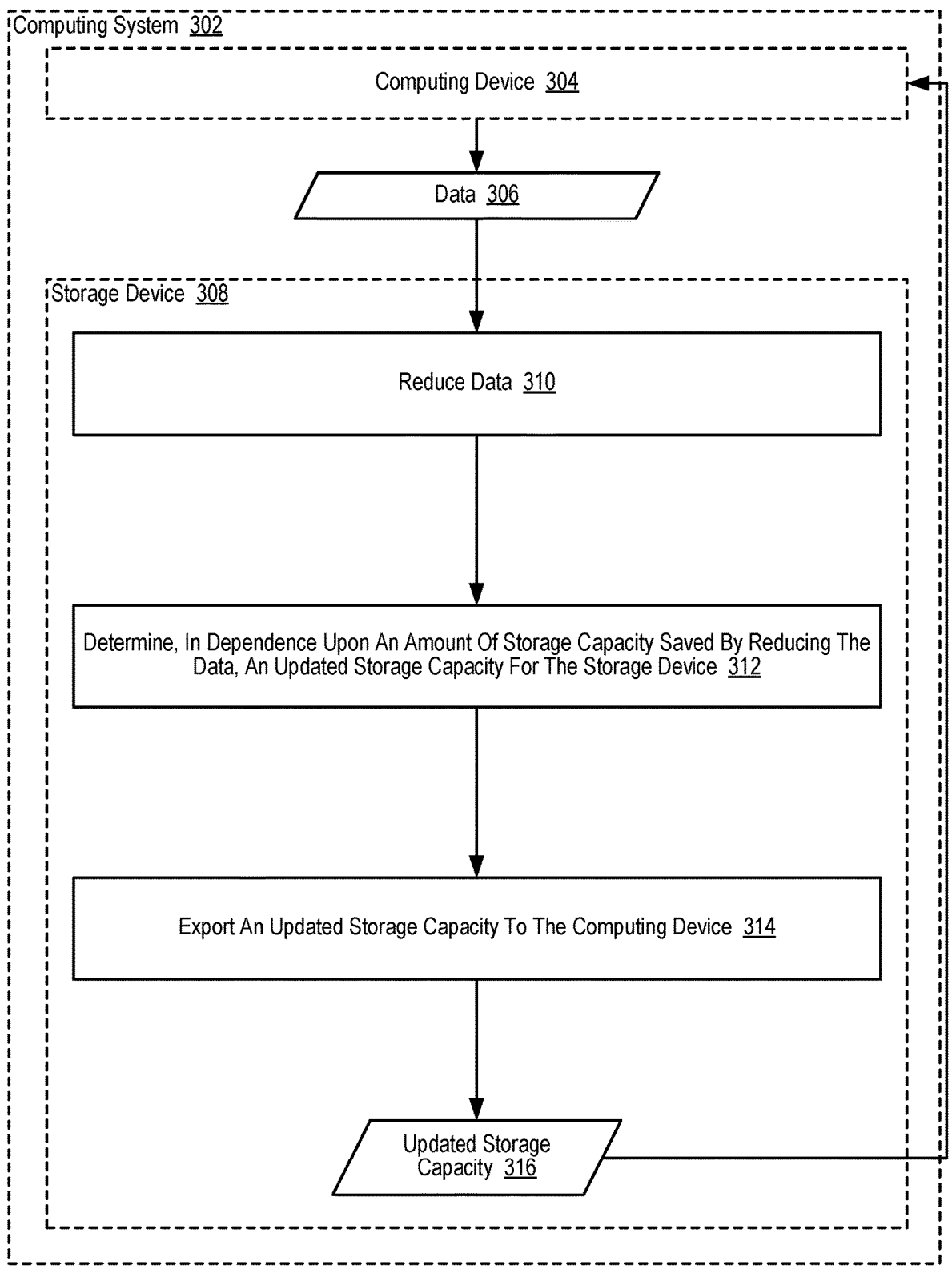
FIG. 3 sets forth a flow chart illustrating an example method for adjusting storage capacity in a computing system according to embodiments of the present disclosure.

For further explanation, FIG. 3 sets forth a flow chart illustrating an example method for adjusting storage capacity in a computing system (302) according to embodiments of the present disclosure. The computing system (302) depicted in FIG. 3 includes a computing device (304) that is configured to send access requests to a storage device (308). The computing system (302) depicted in FIG. 3 may be embodied, for example, as one or more storage arrays such as the storage arrays described above with reference to FIG. 1.

The computing device (304) of FIG. 3 may be embodied, for example, as a storage array controller such as the storage array controller described above with reference to FIG. 1 and FIG. 2. In such an example, the computing device (304) may be configured to send access requests to the storage device (308) via one or more data communications links between the computing device (304) and the storage device (308). Such access requests may include, for example, a request to write data to the storage device (308), a request to read data from the storage device (308), a request to delete data from the storage device (308), a request to perform garbage collection operations on the storage device (308), and so on.

The storage device (308) of FIG. 3 may be characterized by a first storage capacity. The first storage capacity may be expressed in terms of MB, GB, or any other appropriate unit of measure. Readers will appreciate that the 'storage capacity' of a storage device (308), as the term is used here, refers to the total storage capacity of the storage device (308), not the amount of free space within a storage device (308) at a given point in time. For example, if the storage device (308) includes a total capacity of 80 GB and the same storage device currently has 40 GB of data stored on the storage device, the storage capacity of the storage device (308) is 80 GB. The first storage capacity of the storage device (308) may be specified by the manufacturer, set during a previous iteration of the method depicted in FIG. 3, or established in other ways.

The example method depicted in FIG. 3 includes reducing (310) data (306). The data (306) may be received by the storage device (308), for example, from the computing device (304) as part of an instruction to write the data (306) to the storage device (308). Reducing (310) the data (306) may be carried out, for example, prior to storing the data (306) such that the size of the data (306) that will ultimately be stored on the storage device (308) is less than the size of the data (306) when the data (306) was sent from the computing device (304) to the storage device (308). In the example method depicted in FIG. 3, the data (306) may be reduced (310), for example, by the storage device (308) or by some other component of the computing system (302).

Consider an example in which the computing device (308) issues a request to the storage device (308) requesting that the storage device (308) stores a file that is 20 MB in size. The storage device (308) may reduce (310) the data (306), for example, by compressing the data (306). In such an example, assume that the compressed version of the file was 8 MB such that the actual amount of storage that the storage device (308) must utilize to store the compressed version of the file is 8 MB. In such a way, the size of the data (306) that will ultimately be stored on the storage device (308) is less than the expected size of the data (306) when the data (306) was sent from the computing device (304) to the storage device (308). Readers will appreciate that reducing (310) the data (306) may be carried out in other ways as will be described in more detail below.

The example method depicted in FIG. 3 also includes determining (312), in dependence upon an amount of storage capacity saved by reducing the data, an updated storage capacity (316) for the storage device (308). Determining (312) an updated storage capacity (316) for the storage device (308) may be carried out, for example, by designating the entire amount of the storage capacity saved by reducing the data as additional capacity, by designating a portion of the storage capacity saved by reducing the data as additional capacity, and so on.

Consider an example in which a storage device (308) is initially characterized by a first storage capacity of 80 GB. In such an example, assume that the computing device (304) issues a request that the storage device (308) store a database that includes 25 GB of data. Further assume that the storage device (308) is able to apply compression algorithms and deduplication algorithms that reduce (310) the database to a size of 10 GB. In such an example, the amount of storage capacity saved by reducing the data is 15 GB. As such, determining (312) the updated storage capacity (316) for the storage device (308) may be carried out by designating the entire amount of the storage capacity saved by reducing the data as additional capacity, such that the storage device (308) now presents itself as having a capacity of 95 GB. Alternatively, determining (312) the updated storage capacity (316) for the storage device (308) may be carried out by designating only a portion of the storage capacity saved by reducing the data as additional capacity, such that the storage device (308) now presents itself as having a capacity of 90 GB.

The example method depicted in FIG. 3 also includes exporting (314) an updated storage capacity (316) to the computing device (304). Exporting (314) the updated storage capacity (316) to the computing device (304) may be carried out, for example, through the use of one or more messages sent from the storage device (308) to the computing device (304). In response to receiving the updated storage capacity (316) to the computing device (304), the computing device (304) may update its view of the storage device (308) such that it treats the storage device (308) as a device whose capacity matches updated storage capacity (316).

Continuing with the example described above where the storage device (308) is initially characterized by a first storage capacity of 80 GB, the computing device (304) issues a request that the storage device (308) store a database that includes 25 GB of data, the storage device (308) is able to apply compression algorithms and deduplication algorithms that reduce (310) the database to a size of 10 GB, and the storage device (308) designates the entire amount of the storage capacity saved by reducing the data as additional capacity, the storage device (308) will export (314) an updated storage capacity (316) of 95 GB to the computing device (304). The computing device (304), which believes that it has committed 25 GB to the storage device (308), will therefore view the storage device (308) as having 70 GB of free storage. Although the examples described above relate to embodiments where storage capacities are expressed in terms of an exact value, embodiments are contemplated where storage capacities are expressed in terms of a range of values.

Figure 4:
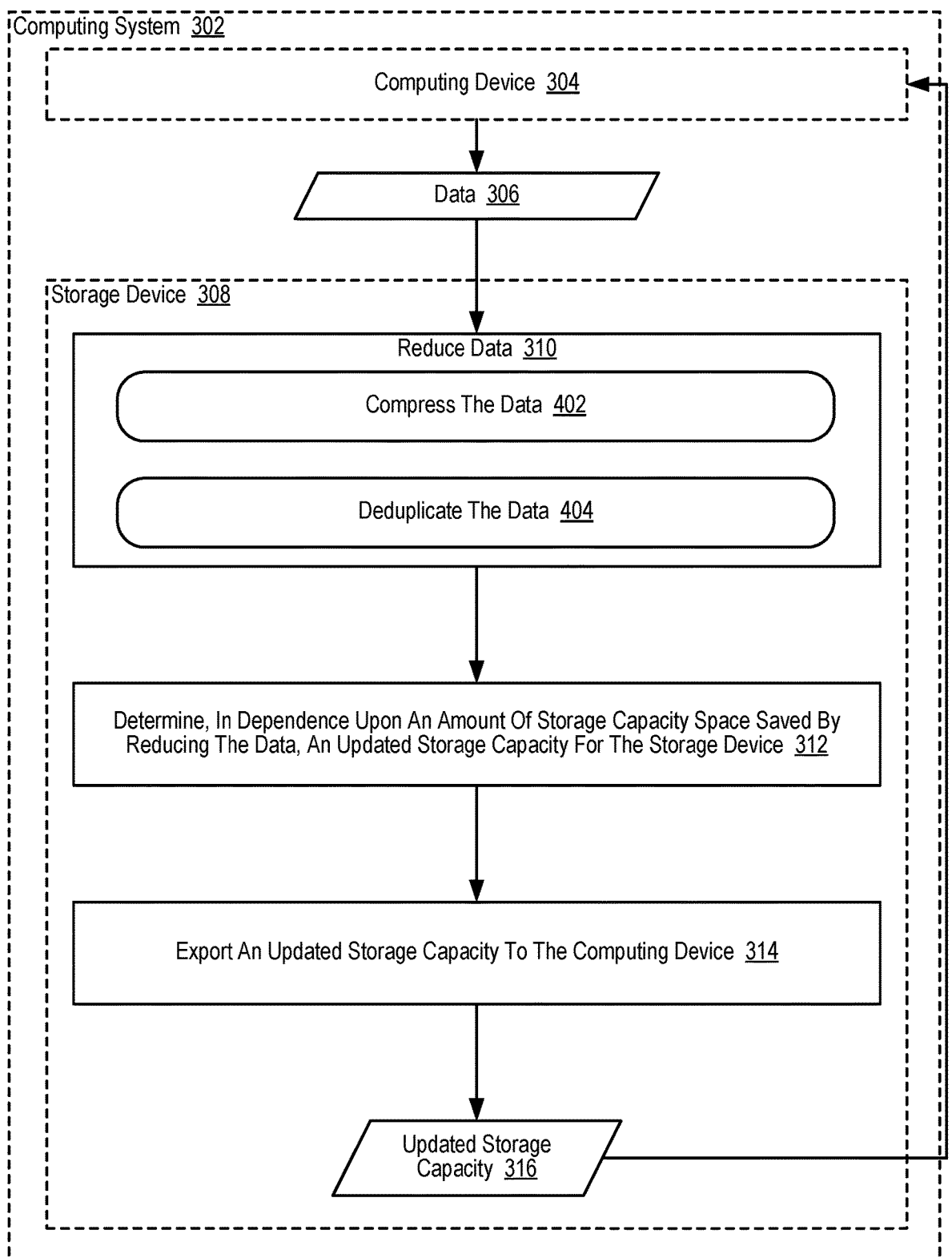
FIG. 4 sets forth a flow chart illustrating an additional example method for adjusting storage capacity in a computing system according to embodiments of the present disclosure.

For further explanation, FIG. 4 sets forth a flow chart illustrating an additional example method for adjusting storage capacity in a computing system (302) according to embodiments of the present disclosure. The example method depicted in FIG. 4 is similar to the example method depicted in FIG. 3, as the example method depicted in FIG. 4 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 4, reducing (310) the data (306) can include compressing (402) the data (306). Compressing (402) the data (306) may be carried out by encoding the data (306) using fewer bits than the original representation, including by identifying and eliminating redundant bits. The storage device (308) may compress (402) the data (306) using control logic within the storage device (308) such as an application-specific integrated circuit ('ASIC'), microcontroller, microprocessor, or other form of computer hardware. Such control logic may be configured to compress (402) the data (306) using one or more compression algorithms such as, for example, LZ77, LZ78, and many others.

In the example method depicted in FIG. 4, reducing (310) the data (306) can alternatively include deduplicating (404) the data (306). Deduplicating (404) the data (306) may be carried out by eliminating duplicate copies of repeating data. The storage device (308) may deduplicate (404) the data (306) using control logic within the storage device (308) such as an ASIC, microcontroller, microprocessor, or other form of computer hardware. Such control logic may be configured to retain signatures for various data elements already stored on the storage device (308), and further configured generate and compare signatures for data to be written to the storage device (308) to the signatures for various data elements already stored on the storage device (308), in order to determine when incoming data is a duplicate of data elements already stored on the storage device (308).

Although the examples described above are related to compressing (402) the data (306) and deduplicating (404) the data (306), readers will appreciate that other techniques (e.g., thin provisioning) may be utilized to reduce (310) the data (306). Furthermore, embodiments of the present disclosure are not limited to using a single technique, as multiple techniques may be utilized in combination.

Figure 5:
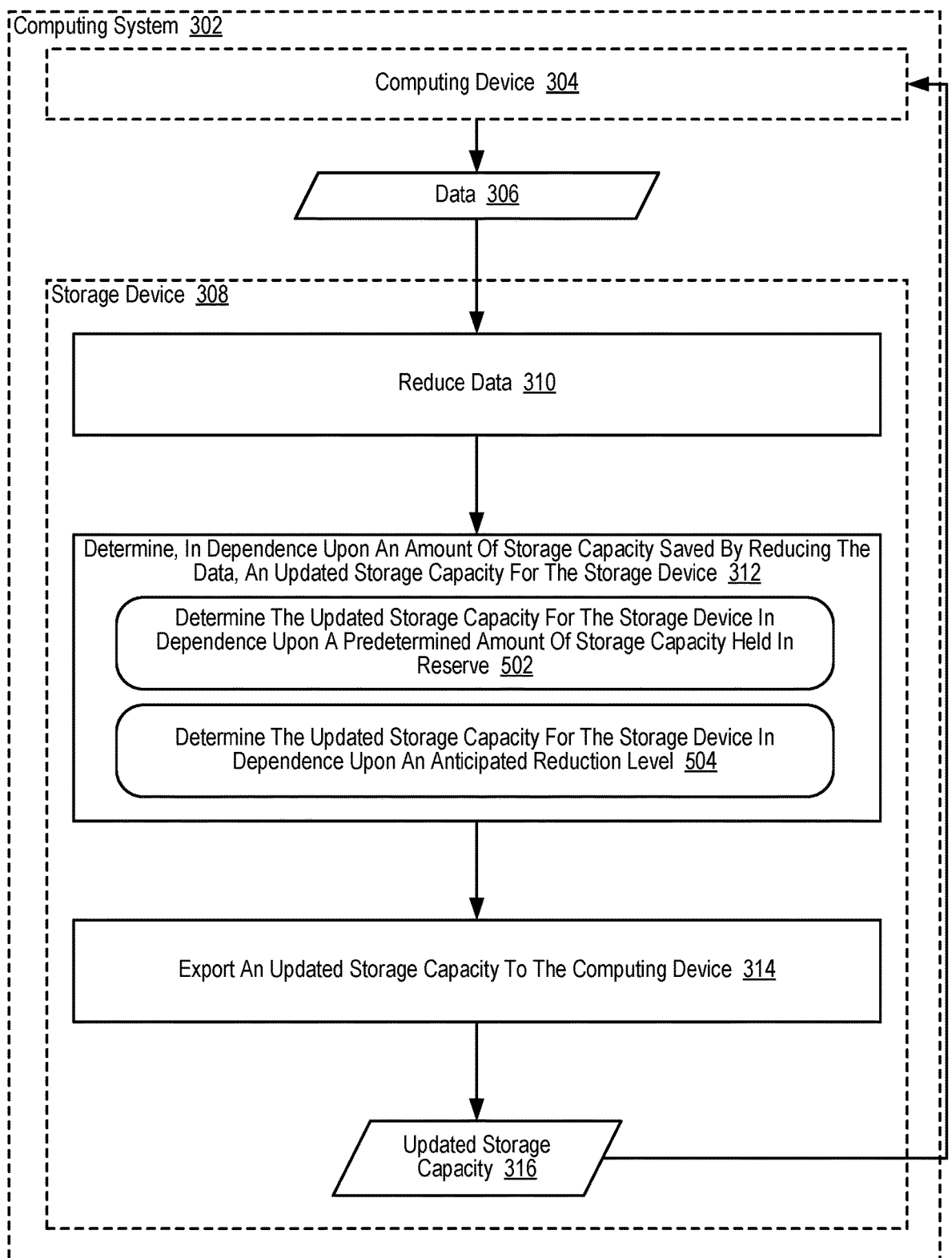
FIG. 5 sets forth a flow chart illustrating an additional example method for adjusting storage capacity in a computing system according to embodiments of the present disclosure.

For further explanation, FIG. 5 sets forth a flow chart illustrating an additional example method for adjusting storage capacity in a computing system (302) according to embodiments of the present disclosure. The example method depicted in FIG. 5 is similar to the example method depicted in FIG. 3, as the example method depicted in FIG. 5 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 5, determining (312) an updated storage capacity (316) for the storage device (308) can include determining (502) the updated storage capacity (316) for the storage device (308) in dependence upon a predetermined amount of storage capacity held in reserve. The storage device (308) may hold a predetermined amount of storage capacity in reserve in order to avoid over representing the capacity of the storage device (308), or for some other purpose. Determining (502) the updated storage capacity (316) for the storage device (308) in dependence upon a predetermined amount of storage capacity held in reserve may be carried out, for example, by determining (312) the updated storage capacity (316) for the storage device (308) as described above and subtracting the predetermined amount of storage capacity held in reserve from the updated storage capacity (316) that is ultimately exported (314) to the computing device (304).

Consider the example described above where the storage device (308) is initially characterized by a first storage capacity of 80 GB, the computing device (304) issues a request that the storage device (308) store a database that includes 25 GB of data, the storage device (308) is able to apply compression algorithms and deduplication algorithms that reduce (310) the database to a size of 10 GB, and the storage device (308) designates the entire amount of the storage capacity saved by reducing the data as additional capacity. In such an example, the storage device (308) would export (314) an updated storage capacity (316) of 95 GB to the computing device (304) in the absence of the storage device (308) holding a predetermined amount of storage capacity in reserve. In an embodiment where the storage device (308) does hold a predetermined amount of storage capacity in reserve, however, the storage device (308) would export (314) an updated storage capacity (316) that is reduced by predetermined amount of storage capacity in reserve. If the predetermined amount of storage capacity to be held in reserve was 10 GB, for example, the storage device (308) would export (314) an updated storage capacity (316) of 85 GB to the computing device (304).

In the example method depicted in FIG. 5, determining (312) an updated storage capacity (316) for the storage device (308) can alternatively include determining (504) the updated storage capacity (316) for the storage device (308) in dependence upon an anticipated reduction level. The anticipated reduction level can represent the extent to which future commitments of data to the storage device are expected to be reduced. The anticipated reduction level may be determined, for example, based on the average rate at which all data currently stored on the storage device (308) has been reduced (310).

Consider the example described above where the storage device (308) is initially characterized by a first storage capacity of 80 GB, the computing device (304) issues a request that the storage device (308) store a database that includes 25 GB of data, and the storage device (308) is able to apply compression algorithms and deduplication algorithms that reduce (310) the database to a size of 10 GB. In such an example, the storage device (308) may assume that data to be written to the storage device (308) may reduce at a similar rate (e.g., 25 GB of data will be reduced to 10 GB of data). That is, the storage device (308) sets its anticipated reduction level by assuming that the storage device (308) is able to reduce (310) all data received in the future to 40% of its original size. In such an example, the storage device (308) would determine (504) the updated storage capacity (316) in dependence upon an anticipated reduction level by assuming that the storage device (308) is able to reduce (310) all data received in the future to 40% of its original size, meaning that the storage device (308) could export (314) an updated storage capacity (316) of 200 GB to the computing device (304).

Readers will appreciate that in alternative embodiments, the anticipated reduction level may be determined using other information. For example, the anticipated reduction level may be determined based on known characteristics of the data (306), where data of a first type is expected to reduce at a first rate and data of second type is expected to reduce at a second rate. In another embodiment, the anticipated reduction level may be determined based on known characteristics of the storage device (308), where a first type of storage device is expected to reduce data at a first rate and second type of storage device is expected to reduce data at a second rate. In another embodiment, the anticipated reduction level may be determined based on an amount of data stored on the storage device (308) as incoming data may be more frequently deduplicated when the storage device (308) is full, whereas incoming data may be less frequently deduplicated when the storage device (308) is empty. Readers will appreciate that other techniques may be implemented to determine the anticipated reduction level, and that techniques (including those described above) may be used in combination.

Figure 6:
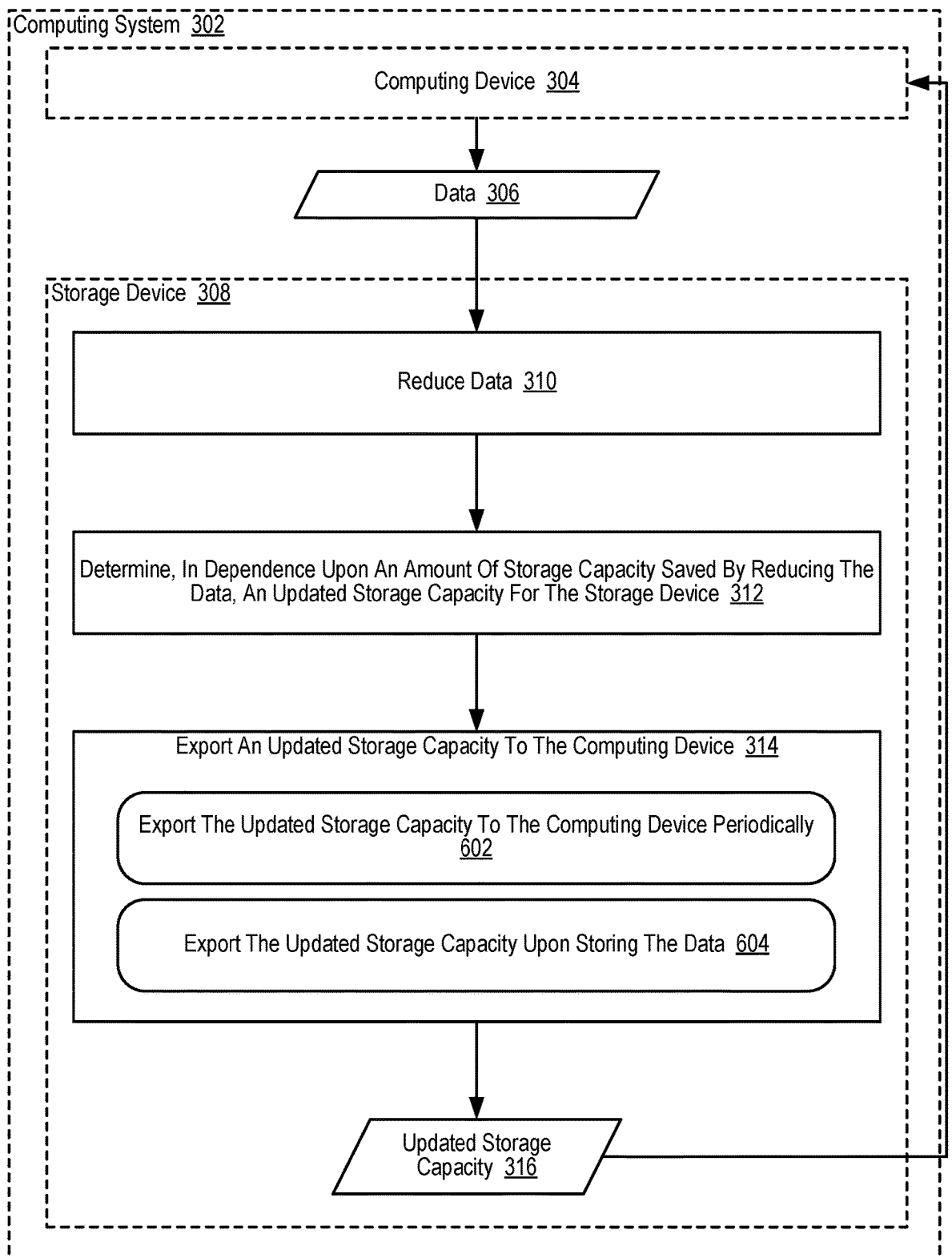
FIG. 6 sets forth a flow chart illustrating an additional example method for adjusting storage capacity in a computing system according to embodiments of the present disclosure.

For further explanation, FIG. 6 sets forth a flow chart illustrating an additional example method for adjusting storage capacity in a computing system (302) according to embodiments of the present disclosure. The example method depicted in FIG. 6 is similar to the example method depicted in FIG. 3, as the example method depicted in FIG. 6 also includes reducing (310) data (306), determining (312) an updated storage capacity (316) for the storage device (308) in dependence upon an amount of storage capacity saved by reducing the data, and exporting (314) the updated storage capacity (316) to the computing device (304).

In the example method depicted in FIG. 6, exporting (314) the updated storage capacity (316) to the computing device (304) can include exporting (602) the updated storage capacity (316) to the computing device (304) periodically. Exporting (602) the updated storage capacity (316) to the computing device (304) periodically may be carried out, for example, by exporting (602) the updated storage capacity (316) to the computing device (304) upon the expiration of a predetermined period of time, by exporting (602) the updated storage capacity (316) to the computing device (304) a predetermined number of times during a predetermined time period, by exporting (602) the updated storage capacity (316) to the computing device (304) according to a predetermined schedule, and so on.

In the example method depicted in FIG. 6, exporting (314) the updated storage capacity (316) to the computing device (304) can alternatively include exporting (604) the updated storage capacity (316) upon storing the data (306). In such an example, each time data is written to the storage device (308), the storage device (308) export (604) the updated storage capacity (316) so that the computing device (304) has an accurate view of the storage device's (308) capacity each time capacity is utilized.

Readers will appreciate that exporting (314) the updated storage capacity (316) to the computing device (304) may occur according to other criteria. For example, the updated storage capacity (316) may be exported (314) to the computing device (304) when the storage capacity changes by a predetermined amount, the updated storage capacity (316) may be exported (314) to the computing device (304) when the storage capacity changes by a predetermined percentage, the updated storage capacity (316) may be exported (314) to the computing device (304) in response to a user request, and so on. Readers will appreciate that all such embodiments are within the scope of the present disclosure.

Example embodiments of the present disclosure are described largely in the context of a fully functional computer system. Readers of skill in the art will recognize, however, that the present disclosure also may be embodied in a computer program product disposed upon computer readable media for use with any suitable data processing system. Such computer readable storage media may be any transitory or non-transitory media. Examples of such media include storage media for machine-readable information, including magnetic media, optical media, or other suitable media. Examples of such media also include magnetic disks in hard drives or diskettes, compact disks for optical drives, magnetic tape, and others as will occur to those of skill in the art. Persons skilled in the art will immediately recognize that any computer system having suitable programming means will be capable of executing the steps of the method of the invention as embodied in a computer program product. Persons skilled in the art will recognize also that, although some of the example embodiments described in this specification are oriented to software installed and executing on computer hardware, nevertheless, alternative embodiments implemented as firmware, as hardware, or as an aggregation of hardware and software are well within the scope of embodiments of the present disclosure.

Although the example described above describe embodiments where various actions are described as occurring within a certain order, no particular ordering of the steps are required. In fact, it will be understood from the foregoing description that modifications and changes may be made in various embodiments of the present disclosure without departing from its true spirit. The descriptions in this specification are for purposes of illustration only and are not to be construed in a limiting sense. The scope of the present disclosure is limited only by the language of the following claims.

What is claimed is:

1. A method comprising:
    identifying, by a storage controller, capacity savings from data reduction operations executed for a storage array, the storage array characterized by a total storage capacity;
    determining, by the storage controller, an updated storage capacity for the storage array based on the identifying; and
    representing, to a client of the storage array, based on the determination of the updated storage capacity, an increase to the total storage capacity of the storage array.

2. The method of claim 1, wherein reducing the data further comprises compressing the data.

3. The method of claim 1, wherein reducing the data further comprises deduplicating the data.

4. The method of claim 1, wherein obtaining the updated storage capacity for the storage array further comprises determining the updated storage capacity for the storage array in dependence upon a predetermined amount of storage capacity held in reserve.

5. The method of claim 1, wherein obtaining the updated total storage capacity for the storage array further comprises determining the updated storage capacity for the storage array in dependence upon an anticipated reduction level.

6. The method of claim 1, wherein representing the updated total storage capacity provided by the storage array further comprises representing the updated total storage capacity provided by the storage array periodically.

7. The method of claim 1, wherein representing the updated total storage capacity provided by the storage array further comprises representing the updated total storage capacity provided by the storage array upon storing data.

8. A storage system comprising:
    a memory; and
    a processor, operatively coupled to the memory, configured to:
        identify, by a storage controller, capacity savings from data reduction operations executed for a storage array, the storage array characterized by a total storage capacity;
        determine, by the storage controller, an updated storage capacity for the storage array based on the identifying; and
        represent, to a client of the storage array, based on the determination of the updated storage capacity, an increase to the total storage capacity of the storage array.

9. The storage system of claim 8, wherein reducing the data further comprises compressing the data.

10. The storage system of claim 8, wherein reducing the data further comprises deduplicating the data.

11. The storage system of claim 8, wherein determining the updated total storage capacity for the storage array further comprises determining the updated storage capacity for the storage array in dependence upon a predetermined amount of storage capacity held in reserve.

12. The storage system of claim 8, wherein determining the updated total storage capacity for the storage array further comprises determining the updated storage capacity for the storage array in dependence upon an anticipated reduction level.

13. The storage system of claim 8, wherein representing the updated total storage capacity provided by the storage array further comprises representing the updated total storage capacity provided by the storage array periodically.

14. The storage system of claim 8, wherein representing the updated total storage capacity provided by the storage array further comprises representing the updated total storage capacity provided by the storage array upon storing data.

15. A non-transitory computer readable storage medium which, when executed, cause a processing device to:
    identify, by a storage controller, capacity savings from data reduction operations executed for a storage array, the storage array characterized by a total storage capacity;
    determine, by the storage controller, an updated storage capacity for the storage array based on the identifying; and
    represent, to a client of the storage array, based on the determination of the updated storage capacity, an increase to the total storage capacity of the storage array.

16. The non-transitory computer readable storage medium of claim 15, wherein reducing the data further comprises compressing the data.

17. The non-transitory computer readable storage medium of claim 15, wherein reducing the data further comprises deduplicating the data.

18. The non-transitory computer readable storage medium of claim 15, wherein determining the updated total storage capacity for the storage array further comprises determining the updated storage capacity for the storage device in dependence upon a predetermined amount of storage capacity held in reserve.

19. The non-transitory computer readable storage medium of claim 15, wherein determining the updated total storage capacity for the storage array further comprises determining the updated storage capacity for the storage array in dependence upon an anticipated reduction level.

20. The non-transitory computer readable storage medium of claim 15, wherein representing the updated total storage capacity provided by the storage array further comprises representing the updated total storage capacity provided by the storage array periodically.

\* \* \* \* \*